United States Patent
Koshy et al.

(10) Patent No.: US 11,330,551 B2
(45) Date of Patent: May 10, 2022

(54) METHOD AND APPARATUS FOR LOCATION AWARE OPTIMAL WIRELESS LINK SELECTION SYSTEM

(71) Applicant: Dell Products, LP, Round Rock, TX (US)

(72) Inventors: Kamal J. Koshy, Austin, TX (US); Karun P. Reddy, Austin, TX (US); Lars Fredrik Proejts, Taipei (TW)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/538,769

(22) Filed: Aug. 12, 2019

(65) Prior Publication Data

US 2021/0051624 A1 Feb. 18, 2021

(51) Int. Cl.
*H04W 64/00* (2009.01)
*H04W 72/04* (2009.01)
*H04B 17/318* (2015.01)
*H04W 24/10* (2009.01)
*H04W 84/12* (2009.01)

(52) U.S. Cl.
CPC ........ *H04W 64/006* (2013.01); *H04B 17/318* (2015.01); *H04W 24/10* (2013.01); *H04W 72/0453* (2013.01); *H04W 84/12* (2013.01)

(58) Field of Classification Search
CPC .............. H04W 64/006; H04W 24/10; H04W 72/0453; H04W 84/12; H04W 76/16; H04W 76/15; H04W 72/1231; H04W 4/027; H04W 64/00; H04B 17/318;
(Continued)

(56) References Cited

U.S. PATENT DOCUMENTS 8,838,376 B2 9/2014 Garin
8,847,754 B2 9/2014 Buchheim
(Continued)

FOREIGN PATENT DOCUMENTS

| CN | 106255062 A | * | 12/2016 |
| CN | 106922005 A | * | 7/2017 |
| TW | 201628418 A | * | 8/2016 |

OTHER PUBLICATIONS

"Tips for Proper Wireless Access Point Placement" Blog Team A, Mar. 2, 2018, p. 6. (Year: 2018).*

*Primary Examiner* — Ayaz R Sheikh
*Assistant Examiner* — Louis Samara
(74) *Attorney, Agent, or Firm* — Prol Intellectual Property Law, PLLC; H. Kenneth Prol

(57) ABSTRACT

A method of selecting an optimal wireless link based on an information handling system location fingerprint may comprise receiving a plurality of wireless signals from a plurality of address-identified wireless local area network (WLAN) access points (APs), detecting a plurality of time of flight (TOF) signal distances between the information handling system and the plurality of address-identified WLAN APs based on the plurality of wireless signals, determining a location fingerprint of the information handling system, relative to the plurality of address-identified WLAN APs, identifying an optimal wireless link associated with the location fingerprint of the information handling system, and automatically establishing the optimal wireless link associated with the location fingerprint of the information handling system.

20 Claims, 5 Drawing Sheets

(58) Field of Classification Search
CPC ......... G01S 5/10; H04L 43/00; G06F 3/0481; G06T 7/0004
See application file for complete search history.

(56) References Cited

U.S. PATENT DOCUMENTS

| | | | |
|---|---|---|---|
| 8,874,129 | B2 | 10/2014 | Foruntanpour |
| 9,168,656 | B1 | 10/2015 | Wang |
| 9,204,257 | B1 | 12/2015 | Mendelson |
| 9,674,658 | B2 | 6/2017 | Partheesh |
| 9,677,890 | B2 | 6/2017 | Vang |
| 9,802,322 | B2 | 10/2017 | Angle |
| 10,140,769 | B2 | 11/2018 | Kim |
| 1,025,771 | A1 | 4/2019 | Egner |
| 10,278,154 | B2 | 4/2019 | Ronen |
| 2011/0305337 | A1 | 12/2011 | Devol |
| 2015/0031390 | A1 | 1/2015 | Robertson |
| 2015/0181381 | A1* | 6/2015 | Prechner ............... H04W 64/00 455/456.1 |
| 2015/0201410 | A1* | 7/2015 | Tang .................... H04W 76/16 370/329 |
| 2015/0289094 | A1 | 10/2015 | Jang |
| 2016/0282862 | A1 | 9/2016 | Duffley |
| 2016/0338133 | A1* | 11/2016 | Lee ........................ H04L 43/00 |
| 2018/0069932 | A1* | 3/2018 | Tiwari ................. G06F 3/0481 |
| 2018/0075168 | A1* | 3/2018 | Tiwari ................. G06T 7/0004 |
| 2018/0143285 | A1* | 5/2018 | Sen ........................... G01S 5/10 |
| 2018/0152848 | A1* | 5/2018 | Egner ................... H04W 76/18 |
| 2018/0160441 | A1* | 6/2018 | Egner ............... H04W 72/1231 |
| 2018/0367314 | A1 | 12/2018 | Egner |
| 2019/0104497 | A1* | 4/2019 | Alonso ................ H04W 64/00 |
| 2019/0230620 | A1* | 7/2019 | Ohlarik ................ H04W 4/027 |

\* cited by examiner

METHOD AND APPARATUS FOR LOCATION AWARE OPTIMAL WIRELESS LINK SELECTION SYSTEM

CROSS REFERENCE TO RELATED APPLICATIONS #

Related subject matter is contained in the following co-pending applications:

U.S. application Ser. No. 16/530,978, filed Aug. 2, 2019, entitled "SYSTEMS AND METHODS OF ROOM PROFILING USING WIRELESS LOCAL AREA NETWORKS," invented by Dileep Kumar Soma et al., and assigned to the assignee hereof.

U.S. application Ser. No. 16/538,793, filed Aug. 12, 2019, entitled "METHOD AND APPARATUS FOR WIRELESS SIGNAL BASED LOCATION SECURITY SYSTEM," invented by Kamal J. Koshy et al., and assigned to the assignee hereof.

FIELD OF THE DISCLOSURE

The present disclosure generally relates to selection of optimal wireless links for a mobile information handling system. More specifically, the present disclosure relates to selection of optimal wireless links based on a current location of a mobile information handling system relative to address-identified access points (APs) within a wireless network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, communications with the information handling system may occur wirelessly via access to access points or base stations located within range of a network interface of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
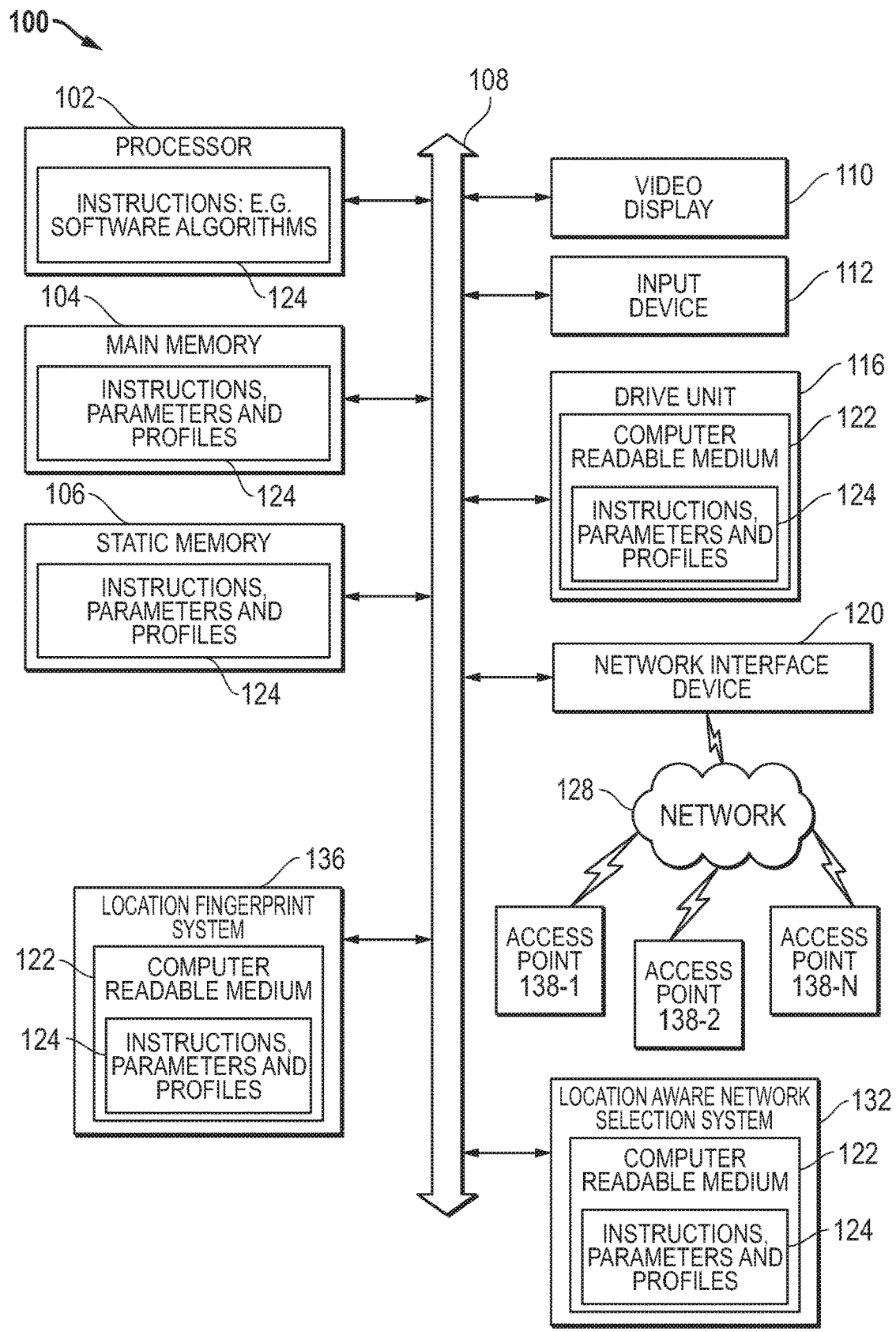
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on stationary information handling systems are now being completed on mobile devices. A wireless network may include one or more wireless access points (APs) in communication with one or more mobile devices. In order to effectively access wireless networks, mobile information handling systems must establish wireless links that are stable, have low traffic, and undergo as little interference as possible. To assist in this process, many existing wireless network systems provide a plurality of available frequency bands, and channels on which a mobile information handling system may communicate. For example, a single AP in existing systems may be capable of transceiving signals in the 2.4 GHz frequency band, the 5 GHz frequency band, and in the 60 GHz (WiGig) frequency band. This may increase the number of available wireless links options, but may simultaneously increase the likelihood of interference caused by nearby APs transceiving in these same ranges. Further, each of these frequency ranges may be associated with different characteristics, such as, for example, distances from the AP that are optimal for communication. More specifically, higher frequency bands may operate most efficiently relatively close to the AP while 2.4 GHz bands operate more efficiently as the mobile information handling system moves away from the AP. The proliferation of such overlapping wireless links presents challenges for users of mobile information handling systems to identify a most optimal wireless link in a given location at a given time.

In existing systems, wireless network interface devices of mobile information handling systems may automatically choose a default wireless link, from a plurality of identified available wireless links, based on the type of signals available, or through signal quality parameters for signals received from multiple nearby APs. For example, in an existing system in which the wireless network interface device detects a nearby AP transceiving in the 2.4 GHz frequency band, the 5 GHz frequency band, and the 60 GHz band, the wireless network interface device may automatically establish a wireless link in the 5 GHz frequency band, based on default parameters. As another example, the wireless network interface device may compare signal quality parameters associated with broadcast signals received from the AP in each of these frequency bands, and establish a wireless link with the AP in the frequency band associated with the highest signal quality parameters. However, such a comparison is often made based on a single quality parameter that does not adequately describe the quality of the signal. For example, most existing systems compare only the relative signal strength indicator (RSSI) for available wireless links, without consideration of other traffic factors, or total throughput of data. As a consequence, such default settings do not necessarily work to identify the most optimal available wireless link. As a result, users often manually change from the default wireless link to other wireless links to improve communication quality.

Further, once a most optimal wireless link is established for a given location (e.g., through default settings or user manipulation), the quality of that wireless link may decrease markedly upon movement of the mobile information handling system to another location, even within the same wireless network. For example, in a home network with multiple APs, each transceiving in multiple frequency ranges, a mobile information handling system may establish a wireless link that is optimal for use in the kitchen, but the quality of that same wireless link may drop significantly if the user then moves to the bedroom. As a further complication, a wireless link that is optimal at one time of day may become much less desirable at another time of day. For example, an AP located nearby another AP that may be occupied primarily in evenings, such as a residence may provide high-quality wireless links during the day, when some of the occupants are at work and not actively using their network. However, the same wireless link may be low-quality in the evening, when the occupants return from work and begins using their network. A system is needed that can automatically and adaptively choose an optimal wireless link from among a plurality of APs, based on the location of a mobile information handling system at a given time.

Embodiments of the present disclosure address these issues by choosing wireless links that have historically performed well at the location of the mobile information handling system, as defined by a location fingerprint for the mobile information handling system. Such a method in embodiments described herein may include determining a location fingerprint of an information handling system relative to a plurality of address-identified APs. Location fingerprints in an embodiment may describe relative distances between a mobile information handling system and one or more known secured APs regardless of whether location is known, as well signal quality parameters for each wireless link between the mobile information handling system and each of the known APs. The signal quality parameters in an embodiment may be described based on received signal strength indicator (RSSI) values, for example. RSSI values for a given wireless link may vary based on the number and consistency of physical boundaries (e.g., floors, ceilings, walls, doors, furniture, people) through which the signal must pass between the mobile information handling system and a given AP. As such, the location fingerprint in embodiments described herein may define the relative location of the mobile information handling system with respect to the one or more known APs, and the surrounding architectural layout of the secured perimeter and barriers such as walls within which the mobile information handling system is meant to operate.

In embodiments described herein, location fingerprints for one or more mobile information handling systems may be recorded over time to establish historical location data. In addition, such historical location fingerprints may also be associated with a wireless link determined to be most optimal at the location defined by that location fingerprint, at the time the location fingerprint was determined. A location aware network selection system operating at least partially at the mobile information handling system or one or more APs in embodiments may identify a current location fingerprint for the mobile information handling system, and identify a stored, historical location fingerprint that matches or is clustered with the current location fingerprint. The location aware network selection system may then instruct the wireless network interface device of the mobile information handling system to establish a wireless link identified as most optimal in the matching stored, historical location fingerprint. This process may be repeated each time a new location fingerprint is established (e.g., each time the mobile information handling system moves to a new location) in some embodiments. In such a way, the location aware network selection system in embodiments may automatically and adaptively identify the most optimal wireless link, based on the location of a mobile information handling system at a given time and historical performance of wireless links at that location.

FIG. 1 illustrates an information handling system 100 similar to information handling systems according to several aspects of the present disclosure. In embodiments presented herein, the information handling system 100 may include the information handling system 100 forming part of a wireless network and communicatively coupled to a plurality of access points 138-1, 138-2, 138-N. In an embodiment, the information handling system 100 may be any computing device that interacts with the access points 138-1, 138-2, 138-N so as to communicate with the access points 138-1, 138-2, 138-N and/or other devices communicatively coupled to the information handling system 100 shown in FIG. 1.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. Although the present disclosure may refer to the use of a plurality of access points (i.e., wireless access point (WAP)) and at least one information handling system as being an interaction between a Wi-Fi device and a computing device, respectively, the present specification contemplates that other devices may be used in the present system as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Elements within the information handling system 100 can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. Elements of the information handling system 100 can also include one or more buses operable to transmit communications between the various hardware components. Portions of an information handling system 100 may themselves be considered information handling systems 100.

Elements of the information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, access points, client devices, data points, or on-box in individual client information handling systems according to various embodiments herein. In some embodiments, it is understood any or all portions of code instructions 124 may operate on a plurality of information handling systems 100.

Elements of the information handling system 100 may include a processor 102 such as a CPU, GPU, control logic or some combination of the same. Any of the processing resources may operate to execute code that is either firmware or software code. Moreover, elements of the information handling system 100 can include memory such as main memory 104, static memory 106, computer readable medium 122 storing instructions 124 of the location aware network selection system 132, the location fingerprint system 136, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

Elements, such as the information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard. The information handling system 100 can also include a disk drive unit 116.

The network interface device 120 shown as a wireless adapter, can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless network interface device 120 may operate two or more wireless links.

Wireless network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

Elements of the information handling system 100 can include a set of instructions 124 that can be executed to cause the computer system to perform any one or more of the methods or computer-based functions disclosed herein. For example, instructions 124 may execute a location aware network selection system 132, or location fingerprint system 136, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, location aware network selection system 132, and the location fingerprint system 136 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. In an embodiment, the main memory device 104 or any other memory device may maintain certain data used to implement the processes and methods described herein. This data may include a time-of-flight (TOF) signal between the information handling system 100 and each of the access points 138-1, 138-2, 138-N; signal levels or quality parameters such as RSSI; and/or a media access control (MAC) address associated with each of the access points 138-1, 138-2, 138-N.

The disk drive unit 116 and static memory 106 may also contain space for data storage. Further, the instructions 124 may embody one or more of the methods or logic as described herein. For example, instructions relating to the location aware network selection system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the location aware network selection system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The location aware network selection system 132, or location fingerprint system 136 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In an embodiment, the information handling system 100 may include the location aware network selection system 132 and the location fingerprint system 136 that may be operably connected to the bus 108. The location aware network selection system 132 computer readable medium 122 may also contain space for data storage. The location aware network selection system 132 may, according to the present description, perform tasks related to identifying an optimal wireless link established via one of a plurality of access points 138-1, 138-2, 138-N, based on a current location fingerprint. In an embodiment, the location aware network selection system 132 may be in the form of computer readable program code executable by the processor 102 that receives signal strength data from, for example, the network interface device 120 or other device associated with the information handling system 100. In an embodiment, the location aware network selection system 132 may be in the form of an application specific integrated circuit (ASIC) that receives signal strength data from the network interface device 120.

In an embodiment, the location aware network selection system 132 and location fingerprint system 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In an embodiment, the information handling system 100 may include a location fingerprint system 136 that may be operably connected to the bus 108. The location fingerprint system 136 computer readable medium 122 may also contain space for data storage. The location fingerprint system 136 may, according to the present description, perform tasks related to measuring the time interval taken by a signal through a medium. In a specific embodiment, the location fingerprint system 136 may measure the duration of time a signal is sent to or received by one or more access points 138-1, 138-2, 138-N and a response signal is received by or sent by (respectively) an information handling system 100. In this embodiment, the time of flight data may include timestamp data from the access points 138-1, 138-2, 138-N that indicates when the access points 138-1, 138-2, 138-N sent the signal thereby indicating the time of flight value. Alternative embodiments include a series of signals passed between the information handling system 100 and any individual access point 138-1, 138-2, 138-N so as to determine an average time of flight value over the series of sent signals. Again, the signal sent to and from the access points 138-1, 138-2, 138-N and/or information handling system 100 may include a time stamp indicating the time the signal was sent. In an embodiment, the location fingerprint system 136 may measure the TOF using the 802.11mc protocol which is the Wi-Fi® Round-trip-Time (Wi-Fi RTT) protocol used to measure the distance to nearby Wi-Fi® access points 138-1, 138-2, 138-N and used to determine an location of the information handling system 100 within 1-2 meters.

The location fingerprint system 136 may also, according to the present description, perform tasks related to measuring a power present in a received wireless signal such as a signal received by the information handling system 100 from a plurality of access points 138-1, 138-2, 138-N. In an embodiment, the location fingerprint system 136 may be in the form of computer readable program code executable by the processor 102 that receives signal strength data (e.g., received signal strength indicator (RSSI)) from, for example, the network interface device 120 or other device associated with the information handling system 100. In an embodiment, the location fingerprint system 136 may be in the form of an application specific integrated circuit (ASIC) that receives signal strength data from the network interface device 120. During operation of the information handling system 100, a reduced level of measured power in the received wireless signal by the network interface device 120 and analyzed by the location fingerprint system 136 may indicate a physical barrier being placed between the information handling system 100 and any of the access points 138-1, 138-2, 138-N. In some examples, this allows the data received by the information handling system 100 by the plurality of in-range access points 138-1, 138-2, 138-N to be used to define metes and bounds of an area such as a room the information handling system 100 is present within relative to the plurality of address-identified access points. Address-identification for the access points 138-1, 138-2, 138-N may be MAC addresses for example. This may also increase the knowledge of the physical layout of a plurality of rooms defined within an architectural plan of a building the information handling system 100 is present within relative to the secure, address-identified APs.

In an embodiment, the location fingerprint system 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. This communication allows for the location fingerprint system 136 to receive the data related to the signal strength of a received signal from an access point 138-1, 138-2, 138-N and provide data representative of any decrease in signal strength over some period of time (i.e., over nanoseconds).

The location fingerprint system 136 may compare the RSSI data to the time of flight (TOF) data to detect a reduced power level of the signal strength (resulting from the signal passing through a structure) relative to the time the signal took to be received by either or both of the information handling system 100 or network interface device 120 as an indexed value for a location fingerprint. The reduced level in RSSI relative to the TOF data may indicate a barrier or object such as a wall is present between any of the access points 138-1, 138-2, 138-N and any information handling system 100 within the network operating the systems and methods described herein. Thus, a location within a learned architectural layout relative to the address-identified access points 138-1, 138-2, 138-N may be determined according to embodiments herein.

During operation of the information handling system 100, the barrier through which the signal is passed may be any type of object that is one of a permanently fixed object in a room (i.e., wall, ceiling, floor, door, etc.) or an object that is temporarily placed between the information handling system 100 and any of the access points 138-1, 138-2, 138-N (i.e., a chair, an open or closed door, a person, furniture, etc.). In an example, the location fingerprint system 136 may receive the signal strength data from the network interface device 120 and determine, based on any reduced power level of the signal, the relative thickness of the object placed between the information handling system 100 and any of the access points 138-1, 138-2, 138-N. Thus, in this embodiment, the reduced level in the signal strength may be proportional to the distance the signal is passed through any given object. In an embodiment, the location fingerprint system 136 may compare the RSSI to the TOF signal received from any of the access points 138-1, 138-2, 138-N at the information handling system in order to determine whether a reduced power level of the RSSI exceeds a threshold reduced level value. This threshold reduced level value may be set to any sensitivity level that represents a reduced power level of the RSSI the location fingerprint system 136 is capable of detecting. In an embodiment, the location fingerprint system 136 may set the threshold reduced level value between 6 and 10 decibels (dB). As described herein, the location fingerprint system 136 may detect the RSSI and compare the RSSI value to the TOF value at any time and any number of times over a given period of time. Thus, this comparison may be conducted iteratively for any number of times based on instructions provided by, for example, a network administrator providing settings indicating when and how often to conduct the comparison. In a specific example, a motion sensor within the information handling system 100 may detect motion of the information handling system 100 and initiate the methods described herein to detect the RSSI and TOF values in order to create a new location fingerprint related to the position of the information handling system 100 within a room relative to any of the access points 138-1, 138-2, 138-N communicatively coupled to the wireless network and wirelessly detectable by the information handling system 100. In this way, boundaries such as walls and doors can be determined for a layout of a secured space without the need for GPS.

Further, in an embodiment, the location fingerprint system 136 may continually receive signal strength data from any of the access points 138-1, 138-2, 138-N and determine, based on historic signal strength data (i.e., data maintained on the computer readable medium 122), whether that object is a permanent object or whether the object is a temporary object. In the embodiment where the object placed between the information handling system 100 and any of the given access points 138-1, 138-2, 138-N is a permanent object, the location fingerprint system 136 may indicate to the processor 102 that the object is consistently contributing to a reduced power level over a threshold number of sets of signal strength data. This threshold number of sets of signal strength data may be set by a network or system administrator and may be based on the number of times the location fingerprint system 136 causes a signal to be sent from and/or received by the location fingerprint system 136 over a given period of time from that fingerprint location. In the embodiment where the object placed between the information handling system 100 and any of the access points 138-1, 138-2, 138-N is a temporary object the location fingerprint system 136 may indicate to the processor 102 that the object is not normally there. The location fingerprint system 136 may then determine whether the object will contribute to a reduced power level of the signal strength over a threshold number of sets of signal strength data. With multiple indexed TOF and RSSI values for location fingerprints in a room or other defined location, the location fingerprint system 136 may be flexible enough to assess changes due to temporary objects changing the environment in some example embodiments. For example, while three address-identified access points 138-1, 138-2, 138-N may provide location fingerprint data, matching of indexed TOF and RSSI data for two access points within a range of confidence may permit identification of a location fingerprint despite alterations to the indexed third AP TOF and RSSI values due to a temporary barrier or other change in some embodiments. Moreover, a confidence range related to the indexed TOF and RSSI data specific to address-identified APs provides additional flexibility to the determination of a location fingerprint in other embodiments.

The location fingerprint system 136 in an embodiment may also receive all RSSI and TOF data from related to all of the access points 138-1, 138-2, 138-N and/or other information handling systems 100 present within the network. In another embodiment, the location fingerprint system 136 may receive all RSSI and TOF data accrued between the specific information handling system 100 and all access points 138-1, 138-2, 138-N the information handling system 100 has communicated with within the wireless network. The location fingerprint system 136 may use an unsupervised clustering process to create determined location data associated with the networked devices (i.e., access points 138-1, 138-2, 138-N and information handling system 100) having associated media access control (MAC) address or other identification information to determine the metes and bounds of the architectural layout of a building by defining walls and rooms of the building (i.e., defining physical boundaries around the information handling systems and/or access points). This may include confidence ranges of values expected in an area for location fingerprints for flexibility to account for some variance in conditions due to temporary barriers or other changed conditions. In an embodiment, clustering location fingerprint data may be accomplished by first triangulating the locations of the information handling systems 100 relative to the access points 138-1, 138-2, 138-N associated with the MAC address. In a specific embodiment, the triangulation process may be accomplished through determining relative distances between an information handling system 100 and a plurality of access points 138-1, 138-2, 138-N indexed with ranges of RSSI values for those access points creating a location fingerprint with respect to the MAC address associated with any access points 138-1, 138-2, 138-N as well as the combination of the in-range access points. MAC addresses may be used to identify access points or any other data may identify the access points 138-1, 138-2, 138-N. Distances may be determined through the use of the TOF data received by the information handling system 100 and, specifically, the network interface device 120. Because the signals are propagated generally at the speed of light, this constant value may be used on connection with a time stamp to determine the distance between the information handling system 100 and the plurality of the access points 138-1, 138-2, 138-N.

In an embodiment, the information handling system may detect the presence of a plurality of access points 138-1, 138-2, 138-N and identify those access points 138-1, 138-2, 138-N by their respective MAC addresses. In this embodiment, any given access point 138-1, 138-2, 138-N may have a respective TOF value and corresponding RSSI value associated with it. Because these TOF and RSSI values are unlikely to be repeated among the access point 138-1, 138-2, 138-N pair with and information handling system 100, these unique set of TOF and RSSI values relative to the access points 138-1, 138-2, 138-N MAC addresses may be used as an address-identified fingerprint assigned by the information handling system 100 to each of the access points 138-1, 138-2, 138-N. Consequently, the TOF and RSSI values described herein may be used by the information handling system 100 to determine the locations of the information handling system 100 within an architectural layout relative to the access points 138-1, 138-2, 138-N without additional location data such as GPS or architectural-based location data.

In an embodiment, the information handling system 100 may also detect whether the physical location of any of the access points 138-1, 138-2, 138-N has been changed, whether any of the access points 138-1, 138-2, 138-N has been removed from the wireless network, and/or whether any additional or new access points 138-1, 138-2, 138-N have been communicatively coupled to the wireless network. This is because the RSSI and TOF values associated with any MAC address of any of the access points 138-1, 138-2, 138-N changes, is no longer detectable by the information handling system, or includes a new set of RSSI and TOF values not detected before (respectively). Thus, in this embodiment, any adjustment to the access points 138-1, 138-2, 138-N within the wireless network may be detected by the information handling system and accounted for when the information handling system 100 is developing the architectural layout of the building using the clustering process described herein.

When multiple distances are determined between the information handling system 100 and the plurality of access points 138-1, 138-2, 138-N, a location of the information handling system 100 may be determined. As such, a location fingerprint may be created that associates the MAC address of each access points 138-1, 138-2, 138-N with any RSSI/TOF data pairs. A corresponding location fingerprint may be created the information handling system 100 for each information handling system 100 and access point 138-1, 138-2, 138-N pair, thereby allowing the comparison module 136 of the information handling system 100 to compare the RSSI/TOF pairs from each access point 138-1, 138-2, 138-N and cluster the location fingerprints based on similarities or dissimilarities between the location fingerprints. Indeed, for each access point 138-1, 138-2, 138-N communicatively accessible by the information handling system 100, the information handling system may associate an identification (i.e., a MAC address) of that access point 138-1, 138-2, 138-N with RSSI and TOF data. The information handling system 100 may have a number of RSSI and TOF data sets associated with any given access point 138-1, 138-2, 138-N when the information handling system 100 is physically moved throughout the architectural layout of the building in which the wireless network is deployed.

In some embodiments, the information handling system 100 may be any type of computing device communicatively coupled, either via wire or wirelessly, to any number of devices within a network. In an example, the information handling system 100 is a computing device that includes a processor 102, a main memory device 104, static memory device 106, video display 110, input device 112, drive unit 116, location aware network selection system 132, and location fingerprint system 136. In an embodiment, the information handling system 100 shown in FIG. 1 may by one of many different and distinct information handling systems 100 communicatively coupled within the network to perform the processes and methods described herein.

In some embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 of the information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
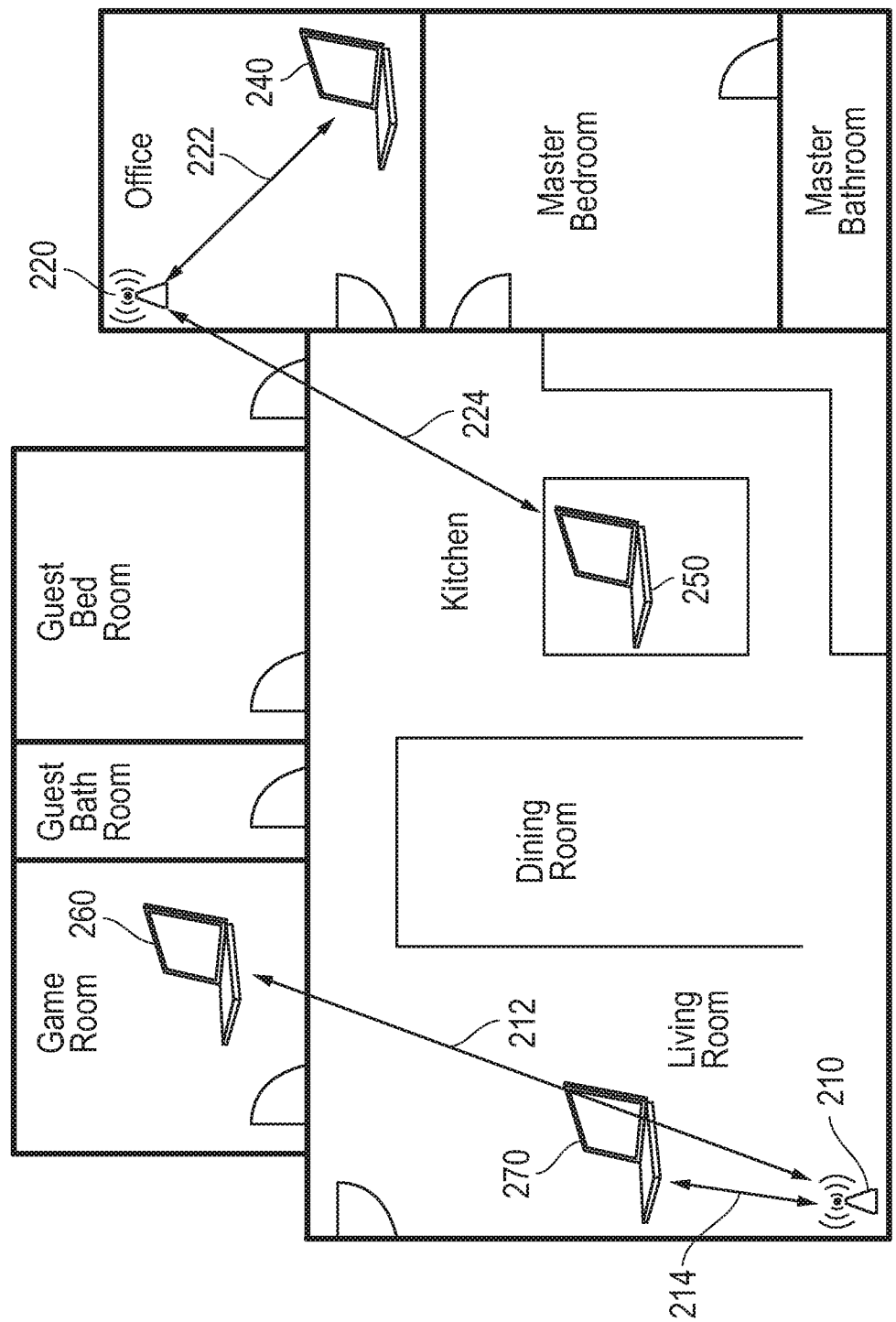
FIG. 2 is a graphic diagram illustrating a mobile information handling system in communication with a plurality of address-identified APs according to an embodiment of the present disclosure.

FIG. 2 is a graphic diagram illustrating a mobile information handling system having a location fingerprint within a home, in communication with a plurality of address-identified APs according to an embodiment of the present disclosure. In the embodiment presented in FIG. 2, two access points 210 and 220 have been deployed within a home wireless network. While the depicted example identifies two in-range access points 210 and 220, the embodiments herein are understood to apply to any number of APs and may also be utilized in home environments, office environments, enterprise locations, secured facilities, or other indoor locations with multiple available wireless options from which selection for data communication may be made. These access points 210 and 220 may be communicatively coupled to a network of devices such as each other as well as any number of information handling systems, including mobile information handling systems 240, 250, 260, or 270 in an embodiment.

In an embodiment, the access points 210 and 220 may be a wireless access point (WAP) or other networking hardware devices that allow other Wi-Fi® or networked devices to connect to a secure, wired network. Thus, in an example, the access points 210 and 220 may be communicatively coupled to the network via a physical, wired connection such as an Ethernet® cable or via a wireless connection such as Wi-Fi® connection, a Bluetooth® connection, and a near-field communication (NFC) connection, among other types of wireless connections.

Access points 210 and 220 in an embodiment may be licensed or unlicensed, and may operate in any number of radio frequency bands. For example, both WLAN and WWAN may use the Unlicensed National Information Infrastructure (U-NII) band which typically operates in the ~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Each of the access points 210 and 220 in an embodiment may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards such as Bluetooth may be used. APs 210 and 220 in some embodiments may establish any combination of macro-cellular wireless connections including 2G, 2.5G, 3G, 4G, 5G or the like from one or more service providers such as Sprint, Verizon, AT&T, and T-Mobile. Service provider macro-cellular base stations may operate pursuant to 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like. Licensed carriers may include small cell base stations that operate in licensed communication frequency bands and may operate as an anchor wireless link in tandem with operation of unlicensed small cell WWAN wireless links of unlicensed small cell WWAN base stations as understood. For example, LTE-LAA or emerging 5G systems may operate with such an example embodiment architecture.

As another example, access points 210 and 220 may comprise unlicensed small cell WWAN base stations in an embodiment. An unlicensed small cell WWAN base station of such an embodiment may operate as a femtocell base station. In another example of such an embodiment, an unlicensed small cell WWAN base station may operate as an eNodeB base station. Example communication frequency bands may also include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless local network, the wireless access points 210 and 220 may operate under Wi-Fi or WiGig as well as small cell WWAN in emerging 5G technology in various embodiments. In several of the presently-described embodiments, Wi-Fi is described but it is understood that other protocols may be used with the embodiments herein.

In an embodiment, any/all of the access points 210 and 220 may transmit broadcast signals, which may be received at the mobile information handling systems 240, 250, 260, or 270 or other information handling systems. Information within these received broadcast signals in an embodiment may be used to determine a relative distance of any single access point to a mobile information handling system. For example, these signals from each of the plurality of access points may include a time stamp indicative of when the signal was sent. In a specific embodiment, the Time of Flight (TOF) values sent to and/or received from each of the access points 210 and 220 may be used to triangulate a position of the mobile information handling systems 240, 250, 260, or 270 or other information handling systems relative, at least, to each of the access points 210 and 220. This process may include comparing the timestamp of the signals from each of the plurality of access points (e.g., 210 and 220) to the time the signal is received by the information handling systems 240, 250, 260, or 270 from each of those points to calculate a time difference and associate the same with a MAC address of each of the in-range access points (e.g., 210 and 220) and/or other information handling systems (not shown) coupled to the network and their respective identifiers. This process may continue with comparing the time differences calculated from each access point (e.g., 210 and 220) and triangulating the position of the information handling systems 240, 250, 260, and 270 relative to each of the access points (e.g., 210 and 220) accordingly. In embodiments, these values may also be indexed with RSSI values from each in-range AP. Although the present description provides a description of a specific process used to determine a location of any given access point relative to a plurality of access points or the information handling system, the present specification contemplates that other methods may be used. These other methods may include the receipt of data indicative of the position of the access points at the information handling system without relying on the information handling system to triangulate its location. Thus, in this embodiment, two or more of access points 210 and 220 may be used to triangulate the relative position of the mobile information handling systems 240, 250, 260, and 270 with respect to the two or more access points 210 or 220.

Upon determining the position of the information handling systems 250 relative to a plurality of access points (e.g., 210 and 220), the systems and methods may detect an RSSI between the information handling systems 250 and a plurality of access points (e.g., 210 and 220). As described herein, when the access points (e.g., 210 and 220) are each within a "line-of-sight" of the information handling systems 240, 250, 260, and 270, a power value associated with an RSSI may not decrease below a threshold indicating that there is no object between the access points (e.g., 210 and 220) and the information handling systems 240, 250, 260, and 270. The term "line-of-sight" as used in the present description is meant to be understood as a path between an information handling systems 240, 250, 260, and 270 and an access point (e.g., 210 and 220) with no object there between. Additionally, when the access points (e.g., 210 and 220) are located in a room separate from any information handling systems 240, 250, 260, and 270, a physical barrier such as wall may disrupt the wireless signals sent between the information handling systems 240, 250, 260, and 270 and access points (e.g., 210 and 220). Thus, the information handling systems 240, 250, 260, and 270 may detect a reduced power level related to the RSSI from any access point (e.g., 210 or 220) or may be so notified by an access point (e.g., 210 or 220) that the RSSI has demonstrated a reduced power level. In either of these embodiments, a reduced power level of the RSSI may indicate that the wall physically separates, for example, an access point 220 and a mobile information handling systems 240, 250, 260, and 270.

As described herein, location fingerprints in an embodiment may describe relative distances between a mobile information handling system and one or more address-identified APs, as well the determined RSSI values described directly above for each wireless link between the mobile information handling system and each of the address-identified APs. RSSI values for a given wireless link may vary based on the number and consistency of physical boundaries (e.g., floors, ceilings, walls, doors, furniture, people) through which the signal must pass between the mobile information handling system and a given AP. As such, the location fingerprint in embodiments described herein may define the relative location of the mobile information handling system with respect to the one or more secured, address-identified APs that deploy the location aware network selection system or location fingerprint system, and indirectly describe the surrounding architectural layout of the secured perimeter within which the mobile information handling system is meant to operate. Location fingerprints for a plurality of mobile information handling system locations determined over time may be stored at the one or more APs in an embodiment, or at a remote storage module accessible by one or more of the APs with which the mobile information handling system has established a wireless link. Stored location fingerprints in an embodiment may include previously measured RSSI and TOF values for information handling systems known to be located within the network, as well as a description of a wireless link established by the information handling system at that location.

The mobile information handling systems 240, 250, 260, and 270 may establish wireless links with one or more of the APs 210 and 220 in an embodiment. The location of each of the mobile information handling systems 240, 250, 260, and 270 in an embodiment may heavily influence the quality of the wireless link established with the one or more APs 210 or 220. For example, the mobile information handling system 240, located in the office in which AP 220 is also located may be capable of establishing wireless links in each of the 2.4 GHz, 5 GHz, and 60 GHz frequency bands with both the AP 210 and the AP 220. The choice of which of these wireless links is most optimal may depend heavily on the location of the mobile information handling system 240 with respect to the APs 210 and 220, with respect to other APs of other networks nearby (not shown), and the traffic in these frequency bands caused by communications between the APs 210 and 220 and other mobile information handling systems 250, 260, or 270. In an example embodiment, the mobile information handling system 240 may determine the highest quality signal available is via AP 220, in the 60 GHz frequency band. In such an embodiment, the mobile information handling system 240 may establish a wireless link 222 with the AP 220 in the 60 GHz frequency band. Location aware network selection system in such an embodiment may then store a description of this wireless link 222 (e.g., identifying AP 220 and frequency band 60 GHz) in association with the current location fingerprint for the mobile information handling system 240 located within the office.

Because the determination of optimal wireless signals depends heavily on the location of the mobile information handling system with respect to the APs 210 and 220, the wireless link most optimal for mobile information handling systems 250, 260, or 270 may be different than the optimal wireless link identified for mobile information handling system 240. In an example embodiment, the mobile information handling system 250, located in the kitchen may determine the highest quality signal available is via AP 220, in the 2.4 GHz frequency band. In such an embodiment, the mobile information handling system 250 may establish a wireless link 224 with the AP 220 in the 2.4 GHz frequency band, and the location aware network selection system may then store a description of this wireless link 224 in association with the current location fingerprint for the mobile information handling system 250 located within the kitchen. In another example embodiment, the mobile information handling system 260, located in the game room may determine the highest quality signal available is via AP 210, in the 2.4 GHz frequency band. In such an embodiment, the mobile information handling system 260 may establish a wireless link 212 with the AP 210 in the 2.4 GHz frequency band, and the location aware network selection system may then store a description of this wireless link 212 in association with the current location fingerprint for the mobile information handling system 260 located within the game room. In still another example embodiment, the mobile information handling system 270, located in the living room may determine the highest quality signal available is via AP 210, in the 5 GHz frequency band. In such an embodiment, the mobile information handling system 270 may establish a wireless link 214 with the AP 210 in the 5 GHz frequency band, and the location aware network selection system may then store a description of this wireless link 214 in association with the current location fingerprint for the mobile information handling system 270 located within the living room.

In an embodiment, one or more of APs 210 or 220 or mobile information handling systems 240, 250, 260, and 270 may operate a portion of a location fingerprint system to determine a current location fingerprint of one or more of information handling systems 240, 250, 260, or 270. In addition, upon determination of such a location fingerprint in an embodiment, one or more of APs 210 or 220 or mobile information handling systems 240, 250, 260, and 270 may operate a portion of the location aware network selection system to identify a wireless link determined to be most optimal for use at that determined location fingerprint, based on stored, historical location fingerprint information. APs 210 or 220 may access remotely stored historical location fingerprints and associated optimal wireless links for a plurality of mobile information handling systems as part of this method in some embodiments. In other embodiments each of the mobile information handling systems 240, 250, 260, or 270 may store historical location fingerprints for that particular mobile information handling system, as well as associated optimal wireless links. The location aware network selection system operating at least partially at the APs 210 or 220, or at one of the mobile information handling systems 240, 250, 260, or 270 in an embodiment may transmit instructions to the network interface device for one of the mobile information handling systems 240, 250, 260, or 270 to establish a wireless link described by the optimal wireless link associated with the historical location fingerprint for that mobile information handling system 240, 250, 260, or 270. In such a way, the location aware network selection system and location fingerprint system in an embodiment may automatically, and adaptively establish the most optimal wireless link for a mobile information handling system at a given location, as defined by a location fingerprint.

Figure 3:
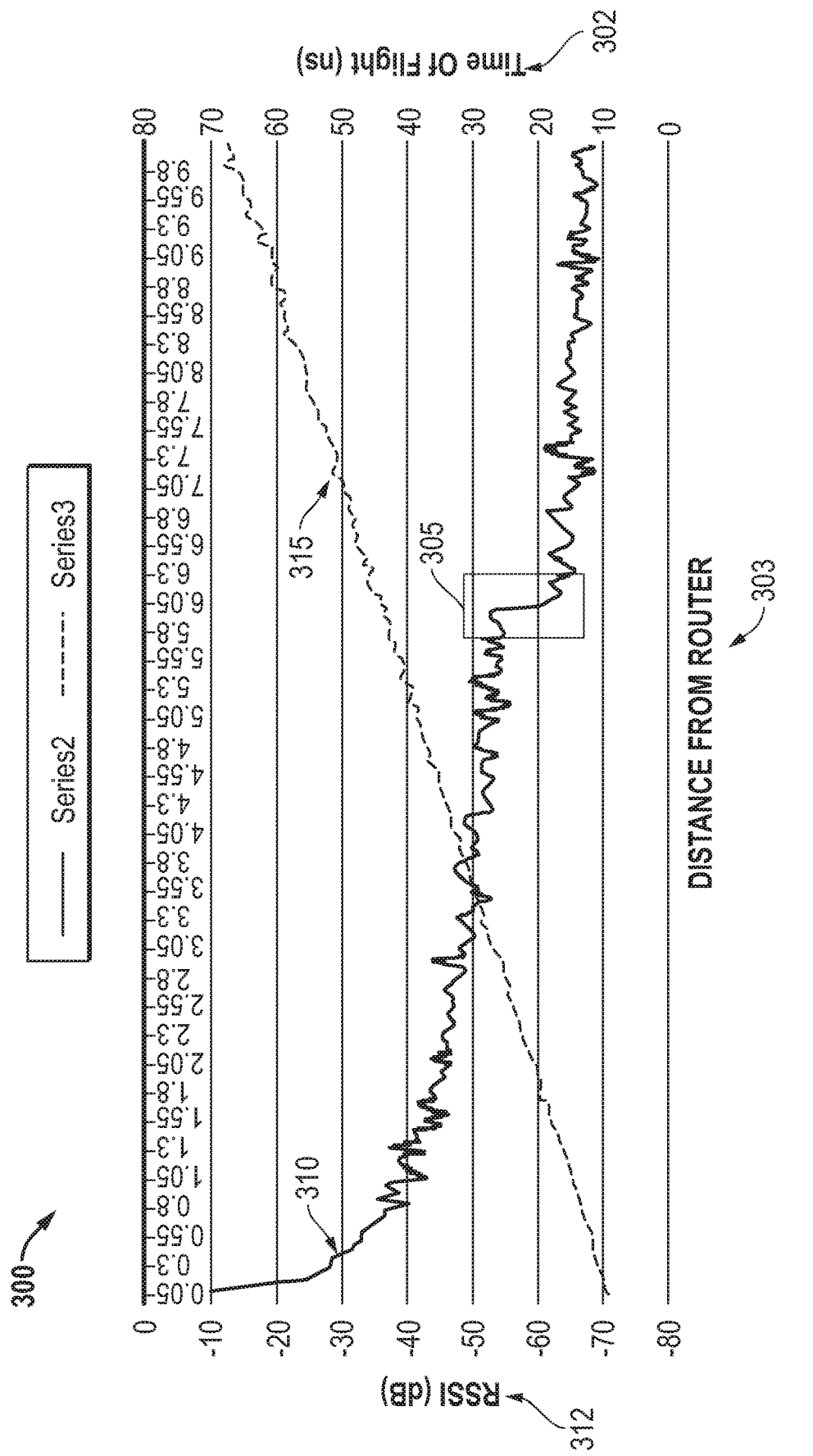
FIG. 3 is a graph showing value of received signal strength indicator (RSSI) value versus a time-of-flight (TOF) value according to an embodiment of the present disclosure.

FIG. 3 is a graph 300 showing value of RSSI 310 versus a TOF 315 according to an embodiment of the present disclosure. The graph 300 shows a RSSI 310 representative of a signal sent or received by either of the access points or information handling systems over distance. As FIG. 3 shows, the RSSI signal strength 312 (measured in decibels (dB)) degrades over time/distance 302/303 and this degradation may be predictable based on the distance of, for example, the information handling system from any one of the access points.

FIG. 3 also shows a TOF line 315 indicative of the time 302 a signal reaches its destination over a distance 303. By way of example, a signal from an access point may be sent to an information handling system along with a timestamp. The time stamp may be accurate enough to provide a TOF value on the order of nanoseconds (ns). Thus, in this example, the access point may provide not only a signal to the information handling system but also provide a timestamp the signal was sent so that the information handling system may compare the timestamp received from the access point with a timestamp the information handling system received the signal. Again, the accuracy of this comparison may be dependent on the precision of the network interface device of the information handling system but may be sufficient to determine the time 302 the signal took to traverse the distance 303 from the access point to the information handling system on the scale of nanoseconds.

FIG. 3 also shows a highlighted area 305 along the RSSI line 310. This specific highlighted area 305 shows a reduced power level (dB) of the RSSI value at a distance from the access point. In this example, this reduced level is detected at 5.8 to 6.3 meters from the source of the signal (i.e., an access point). This reduced power level at 305, per FIG. 3, is around 52 to 65 dB. As compared to the rest of the RSSI line 310, this reduced level may indicate an object is present between the source of the signal (i.e., the access point) and the destination of the signal (i.e., the information handling system).

Figure 4:
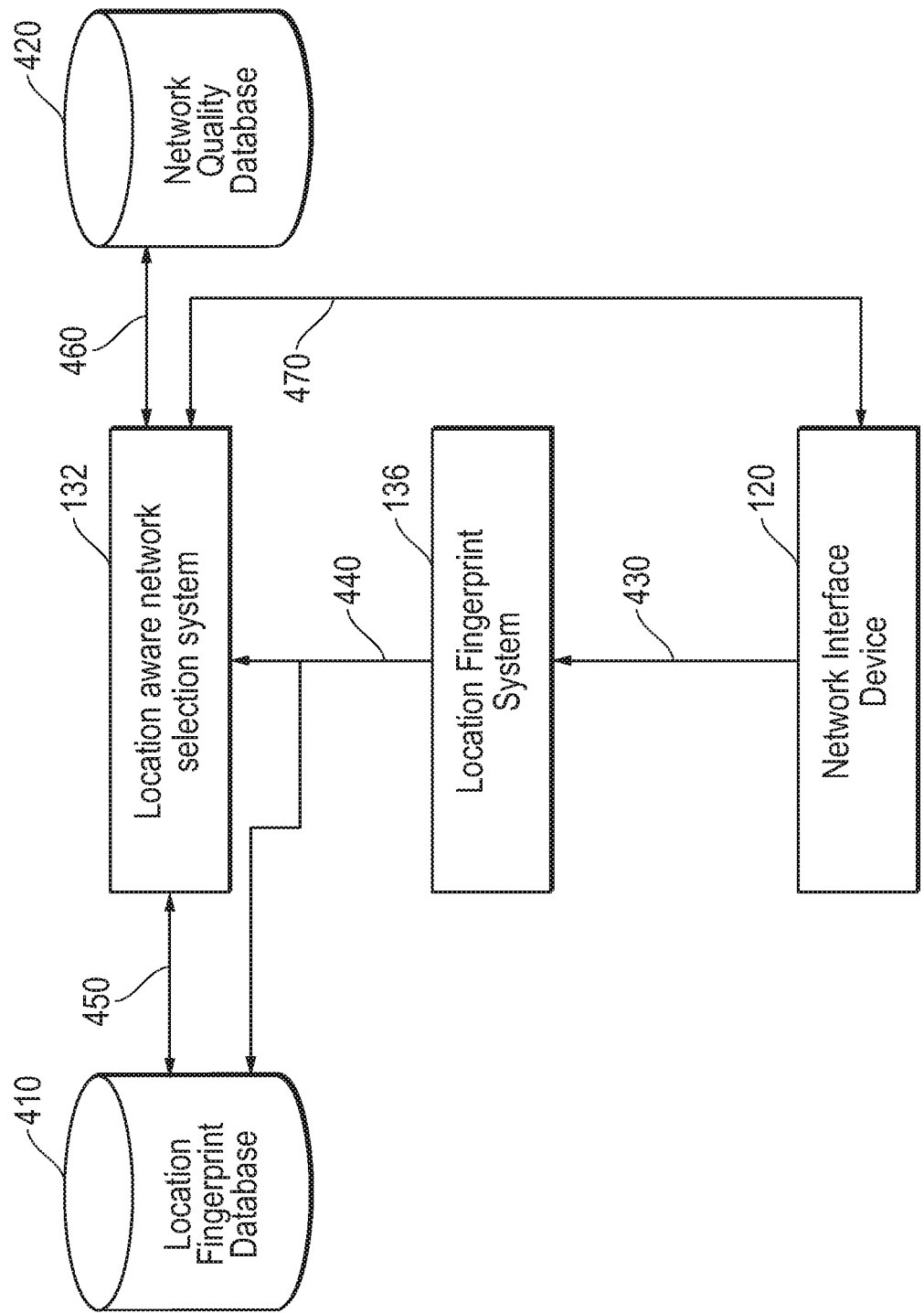
FIG. 4 is a block diagram illustrating a location aware network selection system in communication with a location fingerprint system according to an embodiment of the present disclosure.

FIG. 4 is a block diagram illustrating a location aware network selection system in communication with a location fingerprint system to control functionality of a network interface device according to an embodiment of the present disclosure. The network interface device 120 in an embodiment may be part of an information handling system, such as, for example, a mobile information handling system, and may operate to establish wireless communication between the information handling system and one or more broadcasting, in-range wireless APs. A plurality of APs in-range of the network interface device 120 within a wireless network may transmit broadcast signals, which may be received at the network interface device 120 in an embodiment. Such a broadcast signal in an embodiment may indicate a MAC address of the broadcasting, in-range AP, and a timestamp indicating the time of transmission. The network interface device 120 in an embodiment may forward such a time-stamped broadcast signal 430 to the location fingerprint system 136 in an embodiment, for determination of time of flight between the address-identified, broadcasting AP and the information handling system that includes the network interface device 120.

The location fingerprint system 136 in an embodiment may operate partially across both the information handling system housing the network interface device 120 and the broadcasting AP in an embodiment. In other embodiments, the location fingerprint system 136 may operate entirely within the information handling system housing the network interface device 120, or entirely at the broadcasting AP or other in-range APs in the network. The location fingerprint system 136 in an embodiment may use the time-stamped broadcast signal 430, received from the location fingerprint system 136 to determine a location fingerprint for the information handling system housing the network interface device 120 with respect to one or more in-range APs. In an embodiment, the location fingerprint system 136 may measure the duration of time (TOF) it took for the time-stamped broadcast signal to travel between the broadcasting, in-range AP and the information handling system that includes the network interface device 120, based on the time of transmission given in the time-stamp, and the time of receipt of the broadcast message.

The location fingerprint system 136 may use an unsupervised clustering process to create determined location data associated with the broadcasting, in-range, address-identified APs to determine the location of the network interface device 120 relative to such APs. In an embodiment, this may be accomplished by triangulating the locations of the information handling system that includes the network interface device 120 relative to the address-identified APs. Distances may be determined through the use of the TOF data received by the network interface device 120 within the broadcast message 430. Because the signals are propagated at the speed of light, this constant value may be used on connection with a time stamp to determine the distance between the information handling system that includes the network interface device 120 and the plurality of in-range, broadcasting, address-identified APs.

The location fingerprint system 136 may also perform tasks related to measuring a power present in a received wireless signal such as a signal received by the information handling system housing the network interface device 120 from a plurality of access points. For example, the location fingerprint system 136 may measure relative signal strength indicators (RSSI) of received broadcast signals, or may receive such measurements from subsystems of the network interface device 120. During operation of the information handling system, a reduced level in measured power (RSSI) in the received wireless signal by the network interface device 120 and analyzed by the location fingerprint system 136 may indicate a physical barrier being placed between the information handling system that includes the network interface device 120 and any of the broadcasting access points.

The location fingerprint system in some embodiments may use the combination of TOF, RSSI, and MAC addresses of broadcasting, in-range APs to define metes and bounds of an area such as a room the information handling system is present within relative to the plurality of address-identified access points. For example, the location fingerprint system 136 may compare the RSSI data to the time of flight (TOF) data to detect a reduced power level of the signal strength (resulting from the signal passing through a structure) relative to the time the signal took to be received by network interface device 120. The reduced level in RSSI relative to the TOF data may indicate a barrier or object such as a wall is present between any of the broadcasting, in-range APs and the information handling system housing the network interface device 120. In this way, boundaries such as walls and doors can be determined for a layout of a space in which a wireless network operates without the need for GPS, or a physical architectural layout.

In an embodiment, the location fingerprint system 136 may repeat this process for a plurality of in-range, broadcasting APs. In this embodiment, any given in-range, address-identified AP may have a respective TOF value and corresponding RSSI value associated with it. Because these TOF and RSSI values are unlikely to be repeated among the in-range, address-identified APs and information handling system pairs, these unique set of TOF and RSSI values relative to the address-identified APs may be used as an address-identified fingerprint assigned by the information handling system that includes the network interface device 120 to each of the plurality of in-range, broadcasting, address-identified APs. Consequently, the TOF and RSSI values described herein may be used by the information handling system that includes the network interface device 120 to determine the locations of the information handling system relative to the broadcasting, in-range, address-identified APs without additional location data such as GPS or architectural-based location data. The location fingerprint system 136 may transmit a location fingerprint 440 identifying a relative location of the network interface device 120 with respect to a plurality of broadcasting, in-range, address-identified APs to the location aware network selection system 132 for selection of an optimal wireless link at the relative location. The location fingerprint system 136 in an embodiment may also transmit the location fingerprint 440 for storage at the location fingerprint database 410 to add to historical location information for the information handling system housing the network interface device 120.

In an embodiment, the location aware network selection system 132 may receive the location fingerprint 440 for the information handling system that includes the network interface device 120. As described herein, the location aware network selection system 132 may operate to identify optimal wireless links for a given relative location of an information handling system, based on historical performance metrics at that location for the same or other information handling systems. The location aware network selection system may communicate with databases or other storage modules that contain historical location information or historical performance metrics in order to perform the methods described herein. For example, the location aware network selection system 132 in an embodiment may access a location fingerprint database 410 containing historical location information for one or more of mobile information handling systems, or a network quality database 420 containing historical performance metrics for one or more mobile information handling systems. The location fingerprint database 410 and network quality database 420 in an embodiment may reside at the information handling system that includes the network interface device 120. In other embodiments, the location fingerprint database 410 or network quality database 420 may reside partially, or wholly, within one or more of the plurality of broadcasting, in-range, address-identified APs with which the network interface device 120 may establish wireless links, or at a remote storage unit accessible by one or more of the broadcasting, in-range, address-identified APs, or the information handling system housing the network interface device 120.

As described herein, when the location fingerprint system 136 determines a location fingerprint 440 for the information handling system that includes the network interface device 120, the location fingerprint system 136 may transmit such a location fingerprint 440 for storage at the location fingerprint database 410. This may occur iteratively over time for multiple locations of the information handling system that includes the network interface device 120, and for other information handling systems in wireless communication with the address-identified APs. The location fingerprint database 410 in such an embodiment may thus store a plurality of time-stamped location fingerprints describing locations of a plurality of mobile information handling systems relative to the plurality of broadcasting, address-identified APs with which the network interface device 120 may be in communication.

Upon receipt of a current location fingerprint 440 in an embodiment, the location aware network selection system 132 may request and retrieve past location fingerprints previously stored at the location fingerprint database 410 that match or cluster with the current location fingerprint 440 in order to identify previous times at which mobile information handling systems were located where (or near) the network interface device 120 is now. Storage of the plurality of historical or previously stored location fingerprints at the location fingerprint database 410 allows for comparison of RSSI/TOF pairs from each of the address-identified APs and a plurality of mobile information handling systems. The location aware network selection system 132, or a clustering module operating at the location fingerprint database 410 in an embodiment, may cluster the current location fingerprint 430 and one or more previously stored location fingerprints based on a range of similarities or dissimilarities between the location fingerprints. Because the current location fingerprint 430 includes both TOF and RSSI measurements, it may only match or be clustered with previously recorded location fingerprints taken by an information handling system having the same physical location with respect to the one or more secure, address-identified APs with which the mobile information handling system has established wireless links, and with respect to one or more physical boundaries surrounding the APs and the mobile information handling system. In other words, the location fingerprint will only match or be clustered with previous location fingerprints having similar TOF and RSSI values associated with a given address-identified AP.

The response 450 by the location fingerprint database 410 to the request for a matching historical location fingerprint in an embodiment may include one or more historical location fingerprints matching the current location fingerprint 430 such as TOF and RSSI values within a threshold range of indexed values. While the term "match" or "matching" is used herein with respect to location fingerprints, it is understood that an exact match of values is not required in the embodiments herein. Match refers to falling within a confidence range of indexed TOF or RSSI values relative to address-identified APs such that a location may be identified within a confidence level relative to the currently determined or measured indexed location fingerprint values for particular address-identified APs. Further, clustering of location fingerprints relative to address-identified APs may be used in the embodiments herein to define a location such as a room or other area. The location aware network selection system 132 may operate to cross-reference these matching historical location fingerprints against historical network quality measurements, or known optimal wireless links within the network quality database 420. In some embodiments, the previous location fingerprint matching the current location fingerprint may be associated at the network quality database 420 with a single, known, optimal wireless link. In such an embodiment, the network quality database 420 may transmit a description of the known optimal wireless link (e.g., MAC address of AP with which wireless link was established, and frequency range of wireless link) at 460 to the location aware network selection system 132.

In other embodiments, the network quality database 420 may store multiple historical measurements of wireless link performance metrics measured from the previously determined location fingerprint matching the current location fingerprint. The performance metrics stored at the network quality database 420 may include identification of a historical location fingerprint, characteristics of a wireless link established between the address-identified AP and the mobile information handling system (e.g., frequency band), and one or more performance metrics (e.g., RSSI, throughput, traffic measurements, or lag). In such a way, historical performance metrics stored at the network quality database 420 may associate a specific location fingerprint with performance of wireless links previously established at that relative location by the mobile information handling system that includes the network interface device 120, or by other mobile information handling systems.

In some embodiments, the performance metrics stored at the network quality database 420 may further include a time of day at which the performance measurements were recorded. As described herein, a wireless link that is optimal at one time of day may become much less desirable at another time of day. For example, an AP located nearby another AP, such as a residence AP where the occupants are away during the day at work, may provide high-quality wireless links during the day due to occupants not utilizing the other AP during the day. However, the same wireless link may be low-quality in the evening, when the occupants return from work and begins using the network. As a consequence, performance metrics recorded at a time of day that is markedly different than the time of day at which the location fingerprint 440 is determined may not provide the best representation of current wireless traffic. Thus, in some embodiments, only wireless links associated within historical performance metrics measured at the same or similar time of day as the location fingerprint 440 may be considered as a potential optimal wireless link.

By comparing such historical wireless link performance metrics against one another, a best-performing historical wireless link may be identified by the location aware network selection system 132. The location aware network selection system 132 may identify a plurality of historical performance metrics stored at the network quality database 420 are associated with the historical location fingerprints retrieved at 450. For example, a first of these historical performance metrics may describe a throughput of 2 Gbps on a 2.4 GHz wireless link established between a mobile information handling system and a first AP. As another example, a second of these historical performance metrics may describe a throughput of 150 Kbps on a 60 GHz wireless link established between the mobile information handling system and the first AP. As yet another example, a third of these historical performance metrics may describe a throughput of 1.6 Gbps on a 5 GHz wireless link established between a different mobile information handling system and a second AP. In one embodiment, the location aware network selection system 132 may identify the 2.4 GHz wireless link established with the first AP, described in the first of these historical performance metrics, as the optimal wireless link for the current location fingerprint 440, based on the fact that it has the highest throughput value in comparison with the second and third historical performance metrics. In other embodiments, other performance metrics or a plurality of performance metrics may be compared. In yet another embodiment the first historical performance metric may have been measured at a time of day that differs markedly (e.g., by eight hours) from the time of day at which the current location fingerprint 440 and the second and third historical performance measurements were taken. In such an embodiment, the location aware network selection system 132 may identify the 5 GHz wireless link established with the second AP, described in the third of these historical performance metrics, as the optimal wireless link for the current location fingerprint 440, based on the fact that it has a higher throughput value in comparison with the second historical performance metric.

Upon determination of an optimal wireless link for the current location fingerprint 440 in an embodiment, the location aware network selection system 132 may transmit an instruction 470 to the network interface device 120 to establish a wireless link having similar or identical characteristics. For example, in an embodiment in which the location aware network selection system 132 identifies the wireless link described in the first historical performance metric described above as the optimal wireless link for the current location fingerprint 440, the location aware network selection system 132 may transmit an instruction 470 to the network interface device 120 to establish a 2.4 GHz wireless link with the first address-identified AP. As another example, in an embodiment in which the location aware network selection system 132 identifies the wireless link described in the third historical performance metric described above as the optimal wireless link for the current location fingerprint 440, the location aware network selection system 132 may transmit an instruction 470 to the network interface device 120 to establish a 5 GHz wireless link with the third address-identified AP. In such a way, the location aware network selection system 132 in an embodiment may identify an optimal wireless link for a given relative location of a mobile information handling system with respect to a plurality of address-identified, in-range APs.

Figure 5:
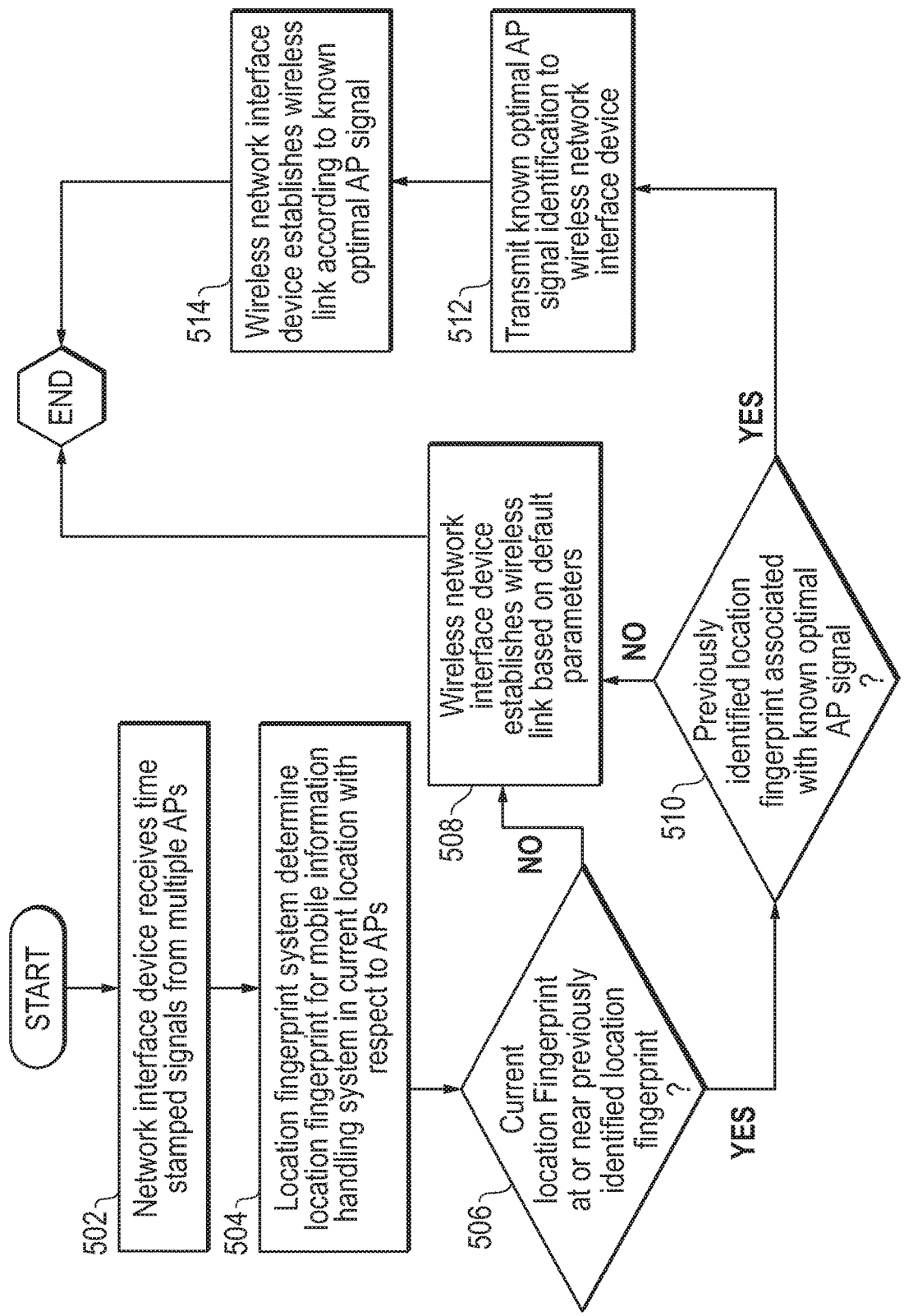
FIG. 5 is a flow diagram illustrating a method of adaptively identifying an optimal wireless link for a specific relative location within a network according to an embodiment of the present disclosure.

FIG. 5 is a flow diagram illustrating a method of adaptively identifying an optimal wireless link for a specific relative location of an information handling system with respect to a plurality of in-range, address-identified APs within a network according to an embodiment of the present disclosure. As described herein, embodiments of the present disclosure may identify wireless links that have historically performed well at a current location of a mobile information handling system, as defined by a location fingerprint for the mobile information handling system. The location aware network selection system may then instruct the wireless network interface device of the mobile information handling system to establish a wireless link identified as most optimal in the matching stored, historical location fingerprint. This process may be repeated each time a new location fingerprint is established (e.g., each time the mobile information handling system moves to a new location) in some embodiments. In such a way, the location aware network selection system in embodiments may automatically and adaptively identify the most optimal wireless link, based on the location of a mobile information handling system at a given time and historical performance of wireless links at that location.

At block 502, a network interface device of a mobile information handling system in an embodiment may receive a time-stamped signal from a plurality of APs. For example, in an embodiment described with reference to FIG. 2, any/all of the access points 210 and 220 may transmit broadcast signals, which may be received at the mobile information handling systems 240, 250, 260, or 270 or other information handling systems. Information within these received broadcast signals in an embodiment may be used to determine a relative distance of any single access point to a mobile information handling system. For example, these signals from each of the plurality of access points may include a MAC address of the broadcasting, in-range AP (e.g., 240, 250, 260, or 270), and a timestamp indicating the time of transmission a time stamp indicative of when the signal was sent. In a specific embodiment, the Time of Flight (TOF) values sent to and/or received from each of the access points 210 and 220 may be used to triangulate a position of the mobile information handling systems 240, 250, 260, or 270 or other information handling systems relative, at least, to each of the access points 210 and 220. These same signals exchanged between address-identified access points 210 and 220 and the mobile information handling systems 240, 250, 260, or 270 or others may also provide signal strength values such as RSSI values as well for use with location fingerprint determinations. In another embodiment, described with reference to FIG. 4, such a broadcast signal 430 may be received at the network interface device 120 and forwarded to the location fingerprint system 136, for determination of time of flight between the address-identified, broadcasting AP and the information handling system that includes the network interface device 120.

The location fingerprint system in an embodiment may determine a current location fingerprint for the mobile information handling system at block 504. As described herein, location fingerprints in an embodiment may describe relative distances between a mobile information handling system and one or more address-identified APs, as well the determined RSSI values described directly above for each wireless link between the mobile information handling system and each of the address-identified APs. RSSI values for a given wireless link may vary based on the number and consistency of physical boundaries (e.g., floors, ceilings, walls, doors, furniture, people) through which the signal must pass between the mobile information handling system and a given AP. As such, the location fingerprint in embodiments described herein may define the relative location of the mobile information handling system with respect to the one or more secured, address-identified APs that deploy the location aware network selection system or location fingerprint system, and indirectly describe the surrounding architectural layout of the secured perimeter within which the mobile information handling system is meant to operate.

The process of determining a current location fingerprint for the mobile information handling system in an example embodiment described with reference to FIG. 2 may include comparing the timestamp of the signals from each of the plurality of access points (e.g., 210 and 220) to the time the signal is received by the information handling systems 240, 250, 260, or 270 from each of those points to calculate a time difference and associate the same with a MAC address of each of the in-range access points (e.g., 210 and 220) and/or other information handling systems (not shown) coupled to the network and their respective identifiers. This process may continue with comparing the time differences calculated from each access point (e.g., 210 and 220) and triangulating the position of the information handling systems 240, 250, 260, and 270 relative to each of the access points (e.g., 210 and 220) accordingly. In embodiments, these values may also be indexed with RSSI values from each in-range AP.

In another embodiment described with reference to FIG. 4, the location fingerprint system 136 in an embodiment may use the time-stamped broadcast signal 430 to measure the duration of time (TOF) it took for the time-stamped broadcast signal to travel between the broadcasting, in-range AP and the information handling system that includes the network interface device 120, based on the time of transmission given in the time-stamp, and the time of receipt of the broadcast message. The location fingerprint system 136 may use an unsupervised clustering process to triangulate the locations of the information handling system that includes the network interface device 120 relative to the address-identified APs, and utilize measured power levels present in one or more wireless signals received from the address-identified APs. For example, the location fingerprint system 136 may have measured relative signal strength indicators (RSSI) of received broadcast signals, or may receive such measurements from subsystems of the network interface device 120. The location fingerprint system 136 may repeat this process for a plurality of in-range, broadcasting APs. Because these TOF and RSSI values are unlikely to be repeated among the in-range, address-identified APs and information handling system pairs, these unique set of TOF and RSSI values relative to the address-identified APs may be used as an address-identified fingerprint assigned by the information handling system that includes the network interface device 120 to each of the plurality of in-range, broadcasting, address-identified APs.

At block 506, the location aware network selection system in an embodiment may determine whether the current location fingerprint matches any historical location fingerprints or a threshold confidence range of location fingerprint values previously stored at a location fingerprint database. For example, in an embodiment described with reference to FIG. 4, the location fingerprint system 136 may transmit a location fingerprint 440 identifying a relative location of the network interface device 120 with respect to a plurality of broadcasting, in-range, address-identified APs to the location aware network selection system 132. The location aware network selection system 132 in an embodiment may then access a location fingerprint database 410 storing a plurality of time-stamped location fingerprints describing locations of a plurality of mobile information handling systems relative to the plurality of broadcasting, address-identified APs with which the network interface device 120 may be in communication.

Upon receipt of a current location fingerprint 440 in an embodiment, the location aware network selection system 132 may request and retrieve past location fingerprints previously stored at the location fingerprint database 410 that match or cluster with the current location fingerprint 440 in order to identify previous times at which mobile information handling systems were located where (or near) the network interface device 120 is now. Storage of the plurality of historical or previously stored location fingerprints at the location fingerprint database 410 allows for comparison of RSSI/TOF pairs from each of the address-identified APs and a plurality of mobile information handling systems. The location aware network selection system 132 or a clustering module operating at the location fingerprint database 410 in an embodiment may cluster the current location fingerprint 430 and one or more previously stored location fingerprints based on similarities or dissimilarities between the location fingerprints. Because the current location fingerprint 430 includes both TOF and RSSI measurements, it may only match or be clustered with previously recorded location fingerprints taken by an information handling system having the same physical location with respect to the one or more secure, address-identified APs with which the mobile information handling system has established wireless links, and with respect to one or more physical boundaries surrounding the APs and the mobile information handling system. In other words, the location fingerprint will only match or be clustered with previous location fingerprints having similar TOF and RSSI values associated with a given address-identified AP. As described above, flexibility of the location fingerprint system allows for use of a threshold range of values, such as a confidence range of location fingerprint indexed values to determine a match. Further, with multiple, in-range APs, at least two address-identified APs may provide location fingerprint confidence even if a change has been made to a third or other address-identified AP. For example, an address-identified AP may be moved or taken offline and the system may learn to adapt to the change if sufficient other location fingerprint data is available to confirm a location. If the current location fingerprint does not match a previously determined location fingerprint, an optimal wireless link for this location may not yet be known, and the method may proceed to block 508 for default assignment of a wireless link. If the current location fingerprint matches a previously determined location fingerprint, the method may proceed to block 510 to determine optimal wireless links associated with the previously determined location fingerprint.

In an embodiment in which the current location fingerprint does not match any previously stored location fingerprints, the wireless network device may establish a wireless link based on default parameters at block 508. For example, the wireless network interface device of the mobile information handling system in an embodiment may automatically choose a default wireless link, from a plurality of identified available wireless links, based on the type of signals available, or through signal quality parameters for signals received from multiple nearby APs. For example, in an embodiment in which the wireless network interface device detects a nearby AP transceiving in the 2.4 GHz frequency band, the 5 GHz frequency band, and the 60 GHz band, the wireless network interface device may automatically establish a wireless link in the 5 GHz frequency band, based on default parameters. As another example, the wireless network interface device may compare signal quality parameters associated with broadcast signals received from the AP in each of these frequency bands, and establish a wireless link with the AP in the frequency band associated with the highest signal quality parameters.

In other embodiments, a user may manually choose from a plurality of available wireless links at block 508. This may indicate a user-determined preference for a given wireless link, which often accurately reflects performance of such wireless links. In such an embodiment, the user-specified choice may be stored at a network quality database and associated with the current location fingerprint determined at block 504. In such a way, the user-specified choice may be considered at later date as a potential optimal wireless link for the same or other information handling systems located at the same position described by the current location fingerprint determined at block 504. A current iteration of the method of determining an optimal wireless link for a given location may then end, based on a lack of historical information describing potential optimal wireless links. However, the stored user-selected wireless link may be used in future iterations of this method to inform upon potentially optimal wireless links that could be established by a mobile information handling system having the location defined by the current location fingerprint in the future. In such a way, the location aware network selection system may adaptively update information used to determine optimal wireless links in an embodiment.

At block 510, in an embodiment in which the current location does match a previously stored location fingerprint, the location aware network selection system may determine whether the previously stored location fingerprint is or can be associated with a known optimal AP wireless link. Because the determination of optimal wireless signals depends heavily on the location of the mobile information handling system with respect to the APs the wireless link most optimal for a mobile information handling system at a first location may be different than the optimal wireless link identified for a mobile information handling system at another location. The network quality database in an embodiment may store a plurality of previously identified performance metrics, or a previously identified optimal wireless link for a given previously stored location fingerprint.

For example, in an embodiment described with reference to FIG. 2, the highest quality signal available to the mobile information handling system 240, located in the office may be via AP 220, in the 60 GHz frequency band. An association between the location fingerprint for mobile information handling system 240 and the 60 GHz wireless link established between the mobile information handling system 240 and the AP 220 may be stored in such an embodiment at the network quality database, at the time the mobile information handling system 240 established the 60 GHz wireless link with AP 220. In another example embodiment, the highest quality signal available to the mobile information handling system 250, located in the kitchen may be via AP 220, in the 2.4 GHz frequency band. An association between the location fingerprint for mobile information handling system 250 and the 2.4 GHz wireless link established between the mobile information handling system 250 and the AP 220 may be stored in such an embodiment at the network quality database, at the time the mobile information handling system 250 established the 2.4 GHz wireless link with AP 220. In still another example embodiment, the highest quality signal available to the mobile information handling system 260, located in the game room may be via AP 210, in the 2.4 GHz frequency band. An association between the location fingerprint for mobile information handling system 260 and the 2.4 GHz wireless link established between the mobile information handling system 260 and the AP 210 may be stored in such an embodiment at the network quality database, at the time the mobile information handling system 260 established the 2.4 GHz wireless link with AP 210. In yet another embodiment, the highest quality signal available to the mobile information handling system 270, located in the living room may be via AP 210, in the 5 GHz frequency band. An association between the location fingerprint for mobile information handling system 270 and the 5 GHz wireless link established between the mobile information handling system 270 and the AP 210 may be stored in such an embodiment at the network quality database, at the time the mobile information handling system 270 established the 5 GHz wireless link with AP 210.

The location aware network selection system in an embodiment may access one or more of these stored associations between previously determined location fingerprints matching the current location fingerprint, and known optimal wireless links, or performance metrics for previously established wireless links, to determine an optimal wireless link for the current location fingerprint. For example, in an embodiment described with reference to FIG. 4, the location aware network selection system 132 may operate to cross-reference the matching historical location fingerprints transmitted from the location fingerprint database 410 at 450 against known optimal links or historical network quality measurements within the network quality database 420. In some embodiments, the previous location fingerprint matching the current location fingerprint may be associated at the network quality database 420 with a single, known, optimal wireless link. In such an embodiment, the network quality database 420 may transmit a description of the known optimal wireless link (e.g., MAC address of AP with which wireless link was established, and frequency range of wireless link) at 460 to the location aware network selection system 132.

In other embodiments, the network quality database 420 may store multiple historical measurements of wireless link performance metrics measured from the previously determined location fingerprint matching the current location fingerprint. In such an embodiment, the performance metrics stored at the network quality database 420 may associate a specific location fingerprint with performance of wireless links previously established at that relative location by the mobile information handling system that includes the network interface device 120, or by other mobile information handling systems. By comparing such historical wireless link performance metrics against one another, a best-performing historical wireless link may be identified by the location aware network selection system 132. If the previously identified location fingerprint that matches the current location fingerprint is not associated with a known or determined optimal wireless link, the method may proceed to block 508, for default selection of a wireless link. If the previously identified location fingerprint that matches the current location fingerprint is associated with a known or determined optimal wireless link, the method may proceed to block 512.

The location aware network selection system in an embodiment in which the previously stored location fingerprint is associated with a known optimal AP wireless link may transmit the known optimal AP signal identification to the wireless network interface device at block 512. For example, in an embodiment described with reference to FIG. 4, upon determination of an optimal wireless link for the current location fingerprint 440 in an embodiment, the location aware network selection system 132 may transmit an instruction 470 to the network interface device 120 to establish a wireless link having similar or identical characteristics. For example, in an embodiment in which the location aware network selection system 132 identifies the wireless link described in the first historical performance metric described above as the optimal wireless link for the current location fingerprint 440, the location aware network selection system 132 may transmit an instruction 470 to the network interface device 120 to establish a 2.4 GHz wireless link with the first address-identified AP. As another example, in an embodiment in which the location aware network selection system 132 identifies the wireless link described in the third historical performance metric described above as the optimal wireless link for the current location fingerprint 440, the location aware network selection system 132 may transmit an instruction 470 to the network interface device 120 to establish a 5 GHz wireless link with the third address-identified AP. In such a way, the location aware network selection system 132 in an embodiment may identify an optimal wireless link for a given relative location of a mobile information handling system with respect to a plurality of address-identified, in-range APs.

At block 514, the wireless network interface device in an embodiment may establish a wireless link according to the known optimal AP signal. For example, in an embodiment described with reference to FIG. 4 in which the location aware network selection system 132 transmits an instruction 470 to the network interface device 120 to establish a 2.4 GHz wireless link with the first address-identified AP, the network interface device may establish a 2.4 GHz wireless link with the first address-identified AP. As another example, in an embodiment in which the location aware network selection system 132 transmits an instruction 470 to the network interface device 120 to establish a 5 GHz wireless link with the third address-identified AP, the wireless network interface device may establish a 5 GHz wireless link with the third address-identified AP. The method may then end.

The blocks of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of selecting an optimal wireless link based on an information handling system location fingerprint, comprising:
receiving a plurality of wireless signals from a plurality of address-identified wireless local area network (WLAN) access points (APs) at a first instance in time at a first location;
detecting a plurality of time of flight (TOF) signal distances between an information handling system and the plurality of address-identified WLAN APs based on the plurality of wireless signals their respective signal strengths received at the first instance in time;
determining, via a processor executing code instructions of the information handling system, a first location fingerprint of the information handling system for the first instance in time, for distances to the plurality of address-identified WLAN APs at AP locations within the first location fingerprint and determining a drop in signal strength for indication of a physical barrier between the information handling system and at least one, known address-identified WLAN AP with its AP location within the first location fingerprint to establish the first location fingerprint of the information handling system for the first location outside the physical barrier;
determining whether a first optimal wireless link is associated with the first location fingerprint of the information handling system for the first instance in time at the first location based on previous operation at the first location, and automatically establishing the first optimal wireless link associated with the first location fingerprint of the information handling system; and
establishing a wireless link based on a default wireless link selection parameters if no first optimal wireless link is associated with the first location fingerprint.

2. The method of claim 1 further comprising:
determining, via the processor executing code instructions of the information handling system, a second location fingerprint of the information handling system for a second instance in time, for distances to the plurality of address-identified WLAN APs and determining a second drop in signal strength for indication of a second physical barrier between the information handling system and at least one address-identified WLAN AP;
identifying a second optimal wireless link associated with the second location fingerprint of the information handling system for the second instance in time;
automatically terminating the first optimal wireless link; and
automatically establishing the second optimal wireless link associated with the second location fingerprint of the information handling system.

3. The method of claim 1 further comprising:
determining the first instance in time occurs in a preset time period; and
wherein the first optimal wireless link is associated with the preset time period.

4. The method of claim 1, wherein the first location fingerprint includes a plurality of associations indicating a plurality of physical boundaries between one of the plurality of address-identified WLAN APs and one of the plurality of TOF signal distances.

5. The method of claim 1, wherein the first optimal wireless link is established within the 2.4 GHz frequency band.

6. The method of claim 1, wherein the first optimal wireless link is established within the 5 GHz frequency band.

7. The method of claim 1, wherein the first optimal wireless link is established within the 60 GHz frequency band.

8. An information handling system operating a location aware network selection system, comprising:
   a network interface device receiving a plurality of wireless signals from a plurality of address-identified wireless local area network (WLAN) access points (APs) at a first instance in time;
   a processor executing code instructions to detect a plurality of time of flight (TOF) signal distances between the information handling system and the plurality of address-identified WLAN APs based on the plurality of wireless signals and their respective signal strengths received at the first instance in time for a first location;
   the processor executing code instructions to identify a first location fingerprint of the information handling system for the first instance in time, for distances to each of the plurality of address-identified WLAN APs having AP locations and to determine a drop in signal strength for indication of a physical barrier between the information handling system and at least one, known address-identified WLAN AP and its AP location to determine the first location fingerprint of the information handling system for the first location relative to the plurality of address-identified WLAN APs and the physical barrier;
   the processor executing code instructions of the location aware network selection system to identify a first optimal wireless link associated with the first location fingerprint of the information handling system for the first instance in time at the first location based on previous operation at the first location; and
   the network interface device automatically establishing the first optimal wireless link identified for the first location fingerprint of the information handling system.

9. The information handling system of claim 8 further comprising:
   the processor executing code instructions to determine a second location fingerprint of the information handling system for a second instance in time, relative to the plurality of address-identified WLAN APs;
   the processor executing code instructions to identify a second optimal wireless link associated with the second location fingerprint of the information handling system for the second instance in time;
   the network interface device automatically terminating the first optimal wireless link; and
   the network interface device automatically establishing the second optimal wireless link associated with the second location fingerprint of the information handling system.

10. The information handling system of claim 8 further comprising:
   the processor determining the first instance in time occurs in a preset time period; and
   wherein the first optimal wireless link is associated with the preset time period.

11. The information handling system of claim 8, wherein the first location fingerprint includes a plurality of associations indicating a plurality of physical boundaries between one of the plurality of address-identified WLAN APs and one of the plurality of TOF signal distances.

12. The information handling system of claim 8, wherein the first optimal wireless link is established within the 2.4 GHz frequency band.

13. The information handling system of claim 8, wherein the first optimal wireless link is established within the 5 GHz frequency band.

14. The information handling system of claim 8, wherein the first optimal wireless link is established within the 60 GHz frequency band.

15. A method of selecting an optimal wireless link based on an information handling system location fingerprint, comprising:
   receiving a plurality of wireless signals from a plurality of address-identified wireless local area network (WLAN) access points (APs) at a first instance in time;
   detecting a plurality of time of flight (TOF) signal distances between an information handling system and the plurality of address-identified WLAN APs based on the plurality of wireless signals and their respective signal strengths received at the first instance in time at a first location of the information handling system;
   determining, via a processor executing code instructions of the information handling system, a first location fingerprint of the information handling system for the first instance in time for distances to the plurality of address-identified WLAN APs having AP locations and determining a first drop in signal strength for indication of a first physical barrier between the information handling system and at least one, known address-identified WLAN AP and its AP location to determine the first location fingerprint of the information handling system for the first location relative to the plurality of address-identified WLAN APs and the physical barrier;
   identifying a first optimal wireless link associated with the first location fingerprint of the information handling system for the first instance in time;
   automatically establishing the first optimal wireless link associated with the first location fingerprint identified for the information handling system at the first location;
   determining, via the processor a second location fingerprint of the information handling system for a second instance in time for distances to the plurality of address-identified WLAN APs and determining a second drop in signal strength for indication of a second physical barrier between the information handling system and the at least one, known address-identified WLAN AP and its AP location to determine the second location fingerprint of the information handling system relative to the plurality of address-identified WLAN APs and the second physical barrier;
   identifying a second optimal wireless link associated with the second location fingerprint of the information handling system for the second instance in time;
   automatically terminating the first optimal wireless link; and
   automatically establishing the second optimal wireless link associated with the second location fingerprint of the information handling system.

16. The method of claim 15 further comprising:
   determining the first instance in time occurs in a preset time period; and wherein the first optimal wireless link is associated with the preset time period.

17. The method of claim 15, wherein the first wireless link is established with a first of the plurality of address-identified WLAN APs and the second wireless link is established with a second of the plurality of address-identified WLAN APs.

18. The method of claim 15, wherein the first wireless link is established within a first frequency band and the second wireless link is established in a second frequency band.

19. The method of claim 15, wherein the first optimal wireless link is established within the 2.4 GHz frequency band.

20. The method of claim 15, wherein the first location fingerprint includes a plurality of associations indicating a plurality of physical boundaries between one of the plurality of address-identified WLAN APs and one of the plurality of TOF signal distances.

* * * * *